United States Patent [19]

Legard

[11] Patent Number: 5,197,218
[45] Date of Patent: Mar. 30, 1993

[54] ICE FISHING POLE

[76] Inventor: Robert L. Legard, 335 Ruddiman, N. Muskegon, Mich. 49445

[21] Appl. No.: 830,724

[22] Filed: Feb. 4, 1992

[51] Int. Cl.⁵ ............................................. A01K 87/00
[52] U.S. Cl. ......................................... 43/23; 43/21.2
[58] Field of Search ................. 43/23, 22, 21.2, 18.1, 43/17, 16

[56] References Cited

U.S. PATENT DOCUMENTS

| | | | |
|---|---|---|---|
| 2,554,927 | 5/1951 | Schultz | 43/16 |
| 3,034,247 | 5/1962 | Lunsman | 43/21.2 |
| 4,467,548 | 8/1984 | Tabor | 43/23 |
| 4,651,461 | 3/1987 | Williams | 43/23 |
| 4,763,435 | 8/1988 | Deering | 43/21.2 |
| 4,858,365 | 8/1989 | Struntz | 43/23 |
| 4,884,356 | 12/1989 | Yasui | 43/23 |

Primary Examiner—Richard K. Seidel
Assistant Examiner—Chuck Y. Mah
Attorney, Agent, or Firm—Price, Heneveld, Cooper, DeWitt & Litton

[57] ABSTRACT

A fishing pole designed especially for fishing through a hole in the ice has a rod portion and a vertically extending, U-shaped support portion which includes an anchor to the rod portion and a line reel attachment portion and a laterally extending base portion beneath the reel portion to support the pole including against lateral tipping by action of a fish.

5 Claims, 1 Drawing Sheet

U.S. Patent  Mar. 30, 1993  5,197,218
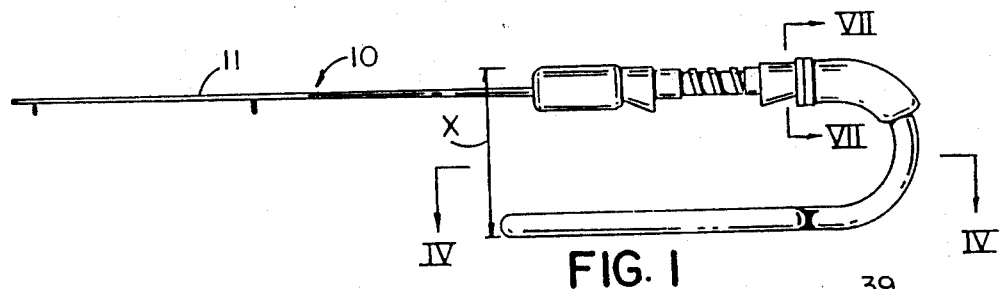
FIG. 1
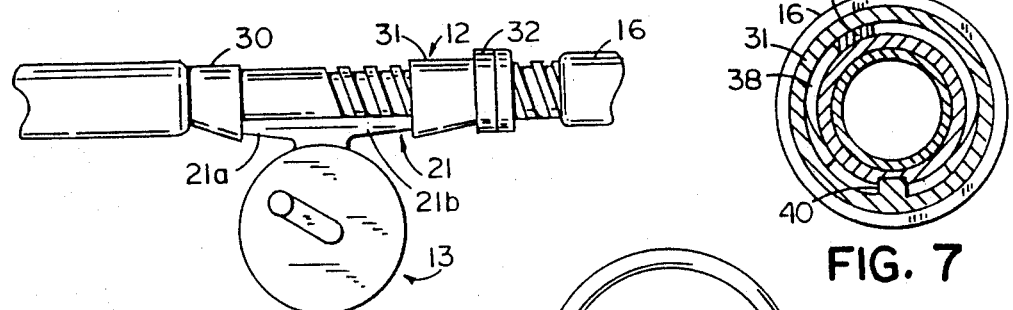
FIG. 2
FIG. 7
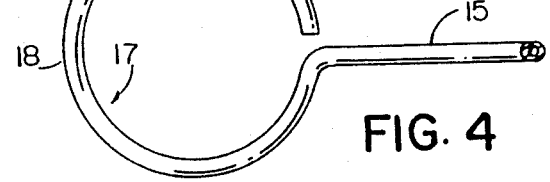
FIG. 4
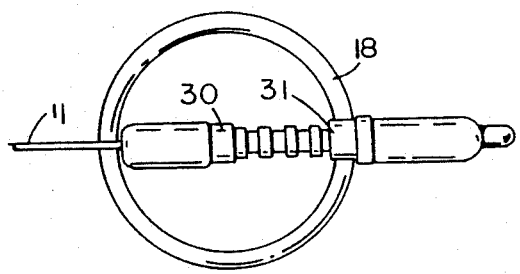
FIG. 3
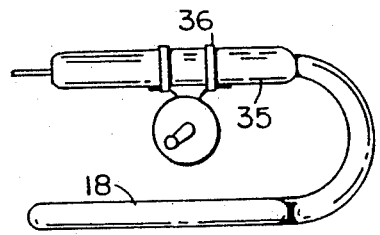
FIG. 5
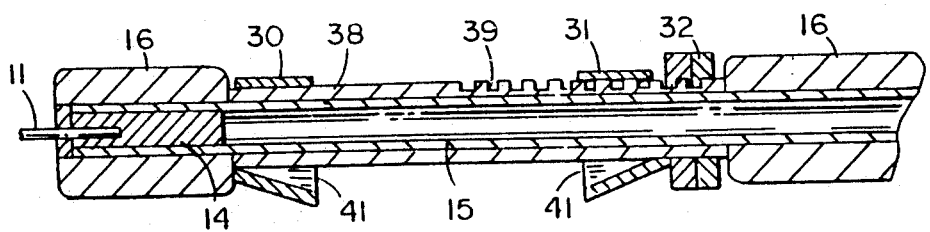
FIG. 6

ICE FISHING POLE

SUMMARY OF THE INVENTION

The invention relates to fishing poles and, in particular, to such a pole designed for fishing through holes cut in the ice and provides a pole support which can rest on the surface of the ice and provide improved stability of support, irrespective of whether the fish pulls down on the line or pulls to the front, back or either side of the pole.

BACKGROUND OF THE INVENTION

In northern climates, a significant amount of fishing is done after the surface of the water freezes sufficiently that it will support the fisherman. A hole is cut in the ice and a baited hook and line are lowered through the holes. Some ice fishing is done through such holes which are surrounded by some type of enclosure, such as a canvas, tent-like enclosure or a small enclosure of more rigid materials, such as composite or plywood panels. However, the use of such enclosures is becoming less common because of the restrictions upon their size and weight and the penalties for failure to remove them before spring breakup of the ice. As a result, more ice fishermen are making several holes in the ice and placing a pole, line and bait at each one. These holes are spaced from each other to give the fisherman a greater area of coverage in the hope that one or more will prove to be fruitful.

At each hole, the fisherman provides a pole, fish line, hook and bait. At each hole, the fisherman normally provides something to hold the pole. Simply to drill a shallow hole in the ice to hold one end of the fishing pole is not a good solution to this need for several reasons, including the necessity for bringing with him a special tool for making a hole of the proper diameter. In very cold weather, the pole may become frozen to the ice. Others bring a forked stick, one end of which is inserted in a small hole in the ice, such as one which can be made by an augur bit and a carpenter's hand brace. Others have provided a block which rests on the ice and has a hole in it, preferably at an angle, into which one end of the fishing rod is inserted for support. These blocks generally are heavy and bulky. Various other arrangements are used. However, all of them require one or more additional units of equipment to avoid a lack of stability in the event the purpose of fishing in the first place is fulfilled, that is, a fish takes the bait, becomes hooked and tries to escape.

BRIEF DESCRIPTION OF THE INVENTION

The invention provides a unitized rod and support base which can be simply seated on the surface of the ice adjacent the fishing hole. It will provide a positive visual signal to the user in the event a fish has taken the bait. It also provides a compact, unitized structure which will support the reel and is so designed that it cannot be pulled down through the hole in the ice, less than 8 inches in diameter, by the fish. It is compact, lightweight and capable of mounting any one of a number of reels of different makes and designs. It is also so designed that it can be easily and quickly stored when not in use. It also provides a hand grip which assures the user of positive control even under the difficult environmental conditions often encountered in ice fishing.

These and other advantages of my invention will be understood by those who use ice fishing equipment upon studying the following drawings and the accompanying description.

BRIEF DESCRIPTION OF THE DRAWINGS

FIG. 1 is a side elevation view of my ice fishing rod and its support;

FIG. 2 is an enlarged, fragmentary, side elevation view of my ice fishing rod with reel attached;

FIG. 3 is a fragmentary plan view of the base and reel attachment for the invention;

FIG. 4 is a fragmentary, sectional view taken along the plane III—III of FIG. 1;

FIG. 5 is a fragmentary view similar to FIG. 1 illustrating a modification of my invention;

FIG. 6 is a fragmentary, central sectional view of the rod and reel clamp of the rod; and FIG. 7 is an enlarged sectional elevation view taken along the plane VII—VII of FIG. 1.

DESCRIPTION OF THE PREFERRED EMBODIMENT

Referring to FIG. 1, the numeral 10 identifies an ice fishing rod assembly having a short pole 11, a clamp 12 for supporting a reel 13 (FIG. 2) for fish line, a pole anchor member 14 (FIG. 6) and a base 15, the upper end of which is covered with a suitable material, such as foam rubber to provide a positive, non-slippery grip 16. The entire body of the rod except the pole 11 but including the base and the reel mount is formed of a single, tubular member which provides the base, supports the reel mount and the rod anchor member. This is the structural support for the rod and integrates all of the various components of the rod.

The base portion is curved rearwardly and downwardly through approximately 180° and then extends forwardly to provide a base support and stabilizer 17 for the rod. The base support includes a large loop 18 portion which extends laterally and also forwardly beneath the reel clamp 12, the pole anchor member 14 and the adjacent portion of the pole 11. This arrangement provides easy access to the fishing rod handle when setting the hook and also keeps the reel and rod handle up off the ice and out of the snow and freezing water. With the rod tip positioned over the hole in the ice, fish aggressively attacking or gently nibbling bait indicate their presence by wiggling of the rod top.

The large loop 18, by extending beyond the forward end of the reel clamp structure requires the fish to apply substantial pull on the line before tipping the base upwardly about the end of the loop 18. By this time, the action of the rod will have alerted the fisherman to the fact that he has a serious bite to work with. Also, as will be observed from FIG. 4, the width of the loop 18 is such as to stabilize the rod against lateral or sideways tipping due to lateral movement of a hooked fish.

In ice fishing, the line extends downwardly from the rod only a short distance before it passes through a hole in the ice which is normally four to six inches in diameter. Thus, the fish can only apply a very limited side thrust to the rod, definitely not normally enough to tip the rod and its base sideways. Further, the size of the loop 18, combined with the space "X" (FIG. 1), which is preferably at least seven inches, prevents the rod and base from being pulled through the hole in the ice, even by a big fish, unless the hole is larger than normally used. Long before this can occur, the fisherman should have been alerted to the fact that he has a fish on the line. It will be recognized that, as a practical matter, it is a preferred construction to recommend to users that the diameter of the ice opening be such that the base 15 cannot pass through this opening, thus providing a positive means for preventing loss of the equipment as well as that of the fish.

The reel 13 can be any one of the many reels now on the market. These reels have a support flange 21 having portions 21a and 21b extending lengthwise of the rod. One flange 21a seats in the pocket of the outer reel grip ring 30 and the other flange 21b is clamped by the inner reel grip 31. When the reel has been placed, it is secured to the housing by sliding the inner grip ring 31 toward the reel until it firmly grips the rear portion 21b of the reel support flange 21 and presses it against the lower face of the reel clamping portion of the fishing rod. The outer and inner grip rings 30 and 31 each have a pocket 41 to seat over an end of the reel base, as illustrated in FIG. 6. The inner grip ring 31 after being slidably moved over the inner end 21b of the reel support 21 is locked in this position by the locking ring 32 which is internally threaded (FIG. 6). This firmly locks the reel in place. This arrangement for securing a reel to a fishing rod is conventional and, therefore, by itself, is not a part of this invention, other than it provides a means for holding the reel storing the fishing line.

FIG. 6 illustrates a preferred construction for mounting the reel portion of the rod. In this construction, the tubular material forming the base 15 extends through the area for mounting the reel 13 and is bonded to the pole's anchor member 14. In the area of the reel attachment, it is telescopically seated within the tubular shell 38 on which the reel gripping rings 30 and 31 are mounted. The segment of the upper and side portions of the shell 38 adjacent to the handle 16 have an external thread 39 molded into it for engaging the internal threading of the locking ring 32. This thread is omitted on the bottom face of the shell 38, which face has a lengthwise extending slot into which a key 40 on the adjacent clamp 12 seats to prevent rotation of the clamp (FIG. 7). The clamp having engaged support flange 21b is secured by engaging it with the locking ring 32.

The entire rod, including the pole 11, can be manufactured of plastic materials, some of which, like the pole 11, are reinforced, such as with fiberglass filaments to provide strength without loss of the flexibility desirable for fishing. The reel support and grip can be molded of ABS, acrylonitrile butadiene styrene, while the base 15 can be formed by forming tubular chlorinated polyvinylchloride into the desired configuration after softening it enough to permit the required shaping. The result is a very lightweight rod, which can be easily stored when not in use and, when use is desired, can be easily transported without significant weight or inconvenience.

FIG. 5 illustrates a modification of the invention in which no means of clamping a line reel to the rod is provided. In this case, the high friction covering 35 of a foamed acrylonitrile/polyvinylchloride extends the entire distance from the pole II to the loop portion. If the fisherman elects to use a reel, it is attached by strapping the reel's support flanges 21a and b to the rod by suitable means, such as masking or electrical tape 36. In both the construction illustrated in FIG. 5 and that illustrated in FIGS. 1 and 2, the vertical spacing between the rod handle and the base 18 should be large enough that the user can quickly and easily manipulate the reel 13 without interference by either the rod or the support 17.

Having described a preferred embodiment of my invention, it will be understood that various modifications of it can be made without departing from its principles and such are to be considered as covered by the hereinafter appended claims unless the language thereof clearly states otherwise.

I claim:

1. A pole for ice fishing having a rod portion, a rod support portion and a base portion, said base and rod support portions being joined by a U-shaped portion, said rod support, U-shaped portion and said base portion all being integral portions of a single length of plastic tubing with said rod support and base portions being substantially parallel, said rod support portion having means at its end remote from said U-shaped portion for securing the end of said rod portion, said rod support and base portions being vertically spaced a distance such that a line reel can be mounted on and suspended from and beneath said rod support portion above said base portion and vertically spaced from said base portion, said base portion having a stabilizing portion extending laterally on both sides of said base portion to resist lateral tipping of the pole.

2. A pole for ice fishing as described in claim 1 wherein said stabilizing portion of said base is substantially circular.

3. A pole for ice fishing as described in claim 2 wherein a portion of said rod and all of aid rod support portion extend over said circular stabilizing portion of said base.

4. A pole for fishing through a hole in ice, said pole having a rod portion, a reel portion, a handle portion and a base portion, all of aid portions being formed from a single length of substantially rigid plastic tubing with said reel and base portions being connected by a vertically extending U-shaped portion, the upper part of said U-shaped portion serving as the handle portion, said base portion underlying said reel portion and part of said rod portion and being substantially parallel thereto and forming a laterally extending pedestal supporting said pole against being laterally overturned, means in said reel portion for detachably securing a reel to said pole, said means being tubular and telescoped over said tubing.

5. A pole for fishing through a hole in ice, said pole having a rod portion, a reel portion, a handle portion and a base portion, all of said portions being formed from a single length of substantially rigid plastic tubing with said reel and base portions being connected by a vertically extending U-shaped portion, the upper part of said U-shaped portion serving as the handle portion, said base portion underlying said reel portion and being substantially parallel thereto and forming a laterally extending pedestal supporting said pole against being laterally overturned, means in said reel portion for detachably securing a reel to said pole, said means being tubular and telescoped over said tubing.

* * * * *

UNITED STATES PATENT AND TRADEMARK OFFICE
CERTIFICATE OF CORRECTION

PATENT NO. : 5,197,218
DATED : March 30, 1993
INVENTOR(S) : Robert L. Legard

It is certified that error appears in the above-indentified patent and that said Letters Patent is hereby corrected as shown below:

Column 2, line 36:
  After "provide" insert --a U-shaped spacer portion and--;

Column 4, line 33:
  "aid" should be --said--;

Column 4, line 38:
  "aid" should be --said--.

Signed and Sealed this

Fifth Day of April, 1994

Attest:

BRUCE LEHMAN

Attesting Officer

Commissioner of Patents and Trademarks